United States Patent
Rinne

(10) Patent No.: US 12,467,116 B2
(45) Date of Patent: Nov. 11, 2025

(54) METHOD AND DEVICE FOR RECOVERING METAL BY LEACHING

(71) Applicant: 3R-CYCLE OY, Hyvinkää (FI)

(72) Inventor: Tero Rinne, Vaasa (FI)

(73) Assignee: 3R-CYCLE OY, Hyvinkää (FI)

( * ) Notice: Subject to any disclaimer, the term of this patent is extended or adjusted under 35 U.S.C. 154(b) by 960 days.

(21) Appl. No.: 17/430,278

(22) PCT Filed: Feb. 12, 2020

(86) PCT No.: PCT/FI2020/050088
§ 371 (c)(1),
(2) Date: Aug. 11, 2021

(87) PCT Pub. No.: WO2020/165502
PCT Pub. Date: Aug. 20, 2020

(65) Prior Publication Data
US 2022/0145420 A1  May 12, 2022

(30) Foreign Application Priority Data
Feb. 12, 2019  (FI) ....................................... 20195101

(51) Int. Cl.
*C22B 7/00*  (2006.01)
*C22B 3/02*  (2006.01)
(Continued)

(52) U.S. Cl.
CPC ................ *C22B 7/006* (2013.01); *C22B 3/02* (2013.01); *C22B 3/04* (2013.01); *C22B 11/046* (2013.01)

(58) Field of Classification Search
CPC ......... C22B 7/006; C22B 3/04; C22B 11/046; C22B 3/06; C22B 11/04; C01B 15/00
See application file for complete search history.

(56) References Cited

U.S. PATENT DOCUMENTS

| 4,752,412 A | 6/1988 | Van Antwerp et al. |
| 5,385,827 A * | 1/1995 | Clark ........................ C22B 3/18 |
| | | 435/14 |

(Continued)

FOREIGN PATENT DOCUMENTS

| CN | 205115558 U | 3/2016 |
| EP | 3604234 A1 | 2/2020 |

(Continued)

OTHER PUBLICATIONS

International Search Report and Written Opinion mailed May 12, 2020 in PCT/FI2020/050088 (12 pages).

(Continued)

*Primary Examiner* — Jonathan Johnson
(74) *Attorney, Agent, or Firm* — Meunier Carlin & Curfman LLC

(57) ABSTRACT

The present disclosure provides a method for recovering metal from metal-containing waste material by leaching, the method comprising providing aqueous solution (14), providing leaching agent precursor, providing a source of external energy (10), treating the aqueous solution (14) with the external energy (10) to form reactive species, reacting the leaching agent precursor with the reactive species to form a leaching agent and to obtain a leaching solution, providing metal-containing material, reacting the metal-containing material with the leaching solution to obtain soluble metal complexes, and recovering the metal complexes. The present disclosure also provides a device for recovering metal by leaching.

17 Claims, 4 Drawing Sheets

(51) Int. Cl.
*C22B 3/04* (2006.01)
*C22B 11/00* (2006.01)

(56) References Cited

U.S. PATENT DOCUMENTS

| | | | |
|---|---|---|---|
| 5,942,098 A | 8/1999 | Sekissov et al. | |
| 6,485,696 B1 * | 11/2002 | Sato | C02F 1/78 |
| | | | 423/127 |
| 2014/0191019 A1 * | 7/2014 | Chen | B09B 3/00 |
| | | | 228/19 |
| 2015/0203935 A1 * | 7/2015 | Nisbett | C22B 3/205 |
| | | | 423/1 |
| 2021/0087079 A1 * | 3/2021 | Kirpalani | C02F 1/5245 |

FOREIGN PATENT DOCUMENTS

| | | |
|---|---|---|
| RU | 2282670 C1 | 8/2006 |
| RU | 2413013 C1 * | 2/2011 |
| RU | 2504648 C1 | 1/2014 |

OTHER PUBLICATIONS

International Preliminary Report on Patentability dated Dec. 17, 2020 in PCT/FI2020/050088 (23 pages).
Finnish Office Action dated Aug. 29, 2019 issued in U.S. Appl. No. 20/195,101 (8 pages).

* cited by examiner

METHOD AND DEVICE FOR RECOVERING METAL BY LEACHING

CROSS-REFERENCE TO RELATED APPLICATIONS

This is a U.S. National Phase Patent Application of International Patent Application Number PCT/FI2020/050088 filed on Feb. 12, 2020, and claiming priority of FI 20195101 filed on Feb. 12, 2019, the contents of both of which are incorporated herein by reference.

FIELD OF THE APPLICATION

The present application relates to a method and device for recovering metal from metal-containing material by leaching using external energy. More particularly the method relates to production of reactive species by treating aqueous solution by the external energy.

BACKGROUND

It is desired to treat metal-containing materials, such as waste materials or ore, to recover precious metals from the material. Such recovery methods include leaching techniques, wherein metals are solubilized from the material using a leaching solution and recovered from the solution.

However, many materials used in leaching contain toxic or harmful substances, which are not desired for environmental and safety reasons. The leaching techniques also involve use of several chemicals and controlling the reaction conditions using other chemicals, which make the process complex, challenging and expensive. It is desired to obtain simpler and environmentally safer metal recovery methods which can be controlled, and which use less chemicals.

SUMMARY

In the present invention it was found out that it was possible to obtain a simple leaching method and device for recovering metals from metal-containing materials, wherein the process could be implemented by providing external non-chemical energy to the process, for example by using sonochemical methods or plasma. In such method fewer chemical agents are required and the process can be controlled and maintained with less additional reagents. This results in an efficient and safe method wherein inexpensive and safe agents may be used. The use of hazardous chemicals, such as cyanide materials or strong acids, for example sulfuric acid or nitrohydrochloric acid, is avoided.

The present disclosure provides a method for recovering metal from metal-containing material by leaching, the method comprising
  providing aqueous solution,
  providing leaching agent precursor,
  providing a source of external energy,
  treating the aqueous solution with the external energy to form reactive species, such as hydrogen peroxide,
  reacting the leaching agent precursor with the reactive species, such as with the hydrogen peroxide, to form a leaching agent and to obtain a leaching solution,
  providing metal-containing material,
  reacting the metal-containing material with the leaching solution to obtain soluble metal complexes, and
  recovering the metal complexes.

One embodiment provides a method for recovering metal from metal-containing material by leaching, the method comprising
  providing aqueous solution,
  providing leaching agent precursor,
  providing a source of ultrasound,
  treating the aqueous solution with the ultrasound to form to form reactive species, such as hydrogen peroxide,
  reacting the leaching agent precursor with the reactive species, such as with the hydrogen peroxide, to form a leaching agent and to obtain a leaching solution,
  providing metal-containing material,
  reacting the metal-containing material with the leaching solution to obtain soluble metal complexes, and
  recovering the metal complexes.

One embodiment provides a method for recovering metal from metal-containing material by leaching, the method comprising
  providing aqueous solution,
  providing leaching agent precursor,
  providing a source of plasma or corona,
  treating the aqueous solution with the plasma or corona to form to form reactive species, such as hydrogen peroxide,
  reacting the leaching agent precursor with the reactive species, such as with the hydrogen peroxide, to form a leaching agent and to obtain a leaching solution,
  providing metal-containing material,
  reacting the metal-containing material with the leaching solution to obtain soluble metal complexes, and
  recovering the metal complexes.

The present disclosure also provides a device for recovering metal from metal-containing material by leaching, the device comprising
  a reactor 11 arranged to receive metal-containing material and aqueous solution 14,
  one or more source(s) of external energy 10 arranged to provide external energy to the aqueous solution 14 in the reactor 11 to form reactive species, such as hydrogen peroxide,
  a redox meter 17 arranged to monitor the redox potential of the aqueous solution 14 and as a feedback to the measurement arranged to adjust the one or more source (s) of external energy 10 to maintain desired level of the reactions in the aqueous solution.

One embodiment provides a device, which may be used in the method, the device comprising
  a reactor arranged to receive metal-containing material and aqueous solution,
  one or more source(s) of ultrasound, such as ultrasound generator(s), arranged to provide ultrasound to the aqueous solution in the reactor to sonochemically form reactive species, such as hydrogen peroxide,
  a redox meter arranged to monitor the redox potential of the aqueous solution and as a feedback to the measurement arranged to adjust the one or more source(s) of ultrasound to maintain desired level of sonochemical reactions in the aqueous solution.

One embodiment provides a device, which may be used in the method, the device comprising
  a reactor arranged to receive metal-containing material and aqueous solution,
  one or more source(s) of plasma or corona arranged to provide plasma or corona to the aqueous solution in the reactor to form reactive species, such as hydrogen peroxide, a redox meter arranged to monitor the redox potential of the aqueous solution and as a feedback to the measurement arranged to adjust the one or more source(s) of plasma or corona to maintain desired level of reactions in the aqueous solution.

The main embodiments are characterized in the independent claims. Various embodiments are disclosed in the dependent claims. The embodiments and examples recited in the claims and the specification are mutually freely combinable unless otherwise explicitly stated.

When the reactive species are generated by providing external energy to the aqueous solution in situ it is possible to obtain for example radicals, redox pairs and/or hydrogen peroxide without adding any highly reactive reagents, which may be harmful or expensive. This also simplifies the method as it is not necessary to purchase, transport, store, handle and control the dosing of such reagents. Leaching agent(s) may be generated from a simple and inexpensive starting material, such as potassium iodide, by using only or mainly the external energy. It is also possible to control and optimize the reaction conditions and the equilibrium of the reactions and concentrations of formed reagents, especially by controlling the source of the external energy. For example, it is possible to control the activation of desired reaction(s), such as optimal formation of oxidant(s), solvent(s), or other reagents to remove or enhance removing of precious metals or other desired substances from the processed raw materials.

It is possible to obtain fully electronic control of the process, as the source of external energy, such as power, frequency and other parameters of a source of ultrasound or other source of energy, may be controlled automatically, for example as feedback to parameters measured directly from the solution. As the process can be efficiently controlled, the cost-efficiency is increased. Also response to controlling actions is fast.

It is also possible to use the source of external energy, especially source of ultrasound, for providing protons and/or hydroxyl ions from water, which ions may be used for adjusting the pH of the solution. Also this simplifies the process, as there is no need to provide separate pH adjusting agents and devices for dosing such agents. It is possible to adjust the pH automatically.

With the present method it is possible to recycle the used reagents efficiently, preferably back to the process, without additional activating reagents.

DETAILED DESCRIPTION

Figure 1:
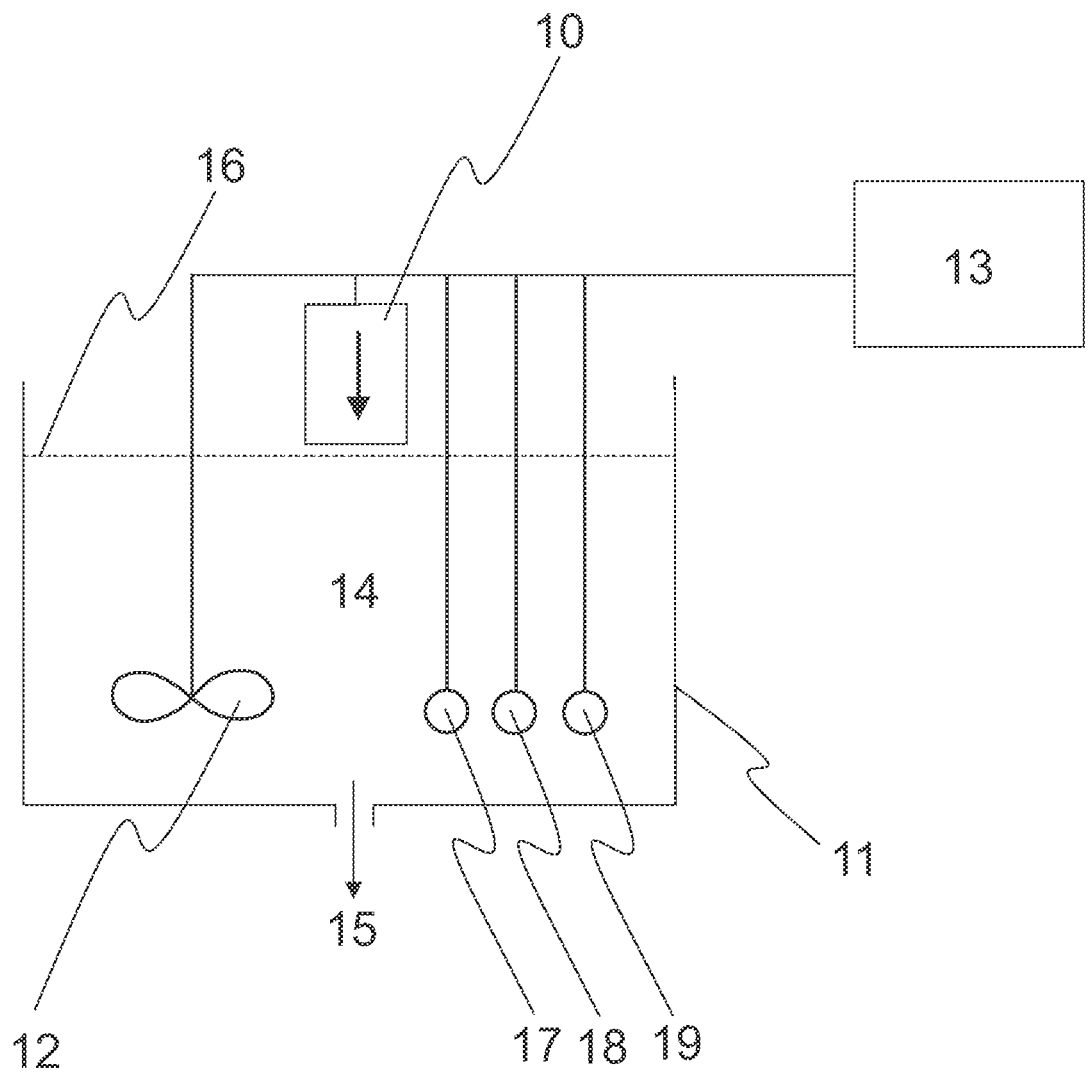
FIG. 1 shows an example of a reactor setup

In this specification, percentage values, unless specifically indicated otherwise, are based on weight (w/w). If any numerical ranges are provided, the ranges include also the upper and lower values. The open term "comprise" also includes a closed term "consisting of" as one option.

Leaching refers to the loss or extraction of certain materials from a carrier into a liquid. More particularly, leaching as discussed herein refers to a process wherein the metal of interest, such as precious metal, or rare earth metal is soluble and the impurities are insoluble. The metal or rare earth metal may occur in mixtures with very large amounts of undesirable constituents, and leaching is used to remove the metals or rare earth metals as soluble salts. The starting material, such as ore or waste, may be called as substrate. The substrate is treated with aqueous leach solution to produce a "pregnant solution", which has the leached metal or rare earth metal of interest therein. The metal or rare earth metal can be recovered from the pregnant solution using any suitable methods.

The leaching solution is an aqueous solution which, when in contact with the substrate, solubilizes at least a portion of the metal of interest in the substrate by oxidizing the metal. This process may be carried out in a pH range 1-10, but in many cases a pH in the range of 4-7 may be used. If acid is added, the pH may be lower, such as in the range of 0-4, 0-3, 1-4 or 1-3. The leaching solution contains one or more leaching agent(s). The leaching solution may be formed at the container or reactor also containing the metal-containing material, or the leaching solution may be formed in a separate container or reactor and then combined with the metal-containing material.

The present disclosure provides a method for recovering metal from metal-containing material by leaching. The metal-containing material may be any suitable material which includes one or more desired metal(s) in material composition containing also materials which are not desired to recover. Rare earth metals, also called as rare earth elements, are included in the term "metal". The embodiments and examples referring to "metals" are also applicable to rare earth metals. Such metal-containing or rare earth metal containing material may comprise ore, jewellery, or waste materials, such as electronic waste. The ore may be ore from mining industry, such as ore concentrate.

Electronic waste may include material from electronic devices, cables and connectors, such as circuit boards, electronic components, coated cables or connectors, and the like. For example circuit boards or connectors may have a gold coating, which is desired to be recovered and separated from the other materials, such as from other metals, for example copper or iron. The waste material may contain complete electronic compounds, circuit boards, connectors, cables or the like, or the material may be provided in crushed or pulverized form. Crushed or pulverized material may be provided as an aqueous suspension, which may be conveyed to and/or in a device in a liquid flow. The jewellery may contain scrap gold, crap silver or other scrap precious metals.

The metal to be recovered may be any desired metal, such as a precious metal. The metal may be for example gold, silver, platinum, palladium, but it may be also refer to copper, zinc, iron, rare earth metals and the like. The rare earth metals may include cerium (Ce), dysprosium (Dy), erbium (Er), europium (Eu), gadolinium (Gd), holmium (Ho), lanthanum (La), lutetium (Lu), neodymium (Nd), praseodymium (Pr), promethium (Pm), samarium (Sm), scandium (Sc), terbium (Tb), thulium (Tm), ytterbium (Yb), and/or yttrium (Y). The metals and rare earth metals are oxidized into soluble ionic forms and then recovered from the solution. One or more metal(s) and/or rare earth metal(s) may be recovered. It may be possible to separate different co-solubilized metals at a later phase by using suitable method, for example precipitation method.

The material may be preprocessed or pretreated to remove impurities and/or metal(s) that is/are not desired to be recovered, such as iron or copper from electronic waste. This removal may be carried out using mechanical, chemical and/or magnetic method(s), which may be automated or semi-automated method(s), especially for crushed or pulverized material. Some impurities or metals may be removed manually. For example ferromagnetic metals may be separated by using magnetic separation method(s), and non-ferromagnetic metals, such as copper, may be separated by using mechanical methods which may include methods based on gravity and/or eddy currents. Such preprocessing or pretreating methods help minimizing chemical consumption in the leaching process and also enhance the cost efficiency and total efficiency of the whole process.

The reactions of the present methods are carried out in a solution, preferably in an aqueous solution, which may be also called as liquid. The aqueous solution is water or water-based solution, which may be formed by adding the ingredients to water. The aqueous solution may or may not contain organic solvents, or it may contain only traces of organic solvents, such as 5% (w/w) or less, for example 2% (w/w) or less or 1% (w/w) or less. The method comprises providing the metal-containing material to the aqueous solution. The material may be provided as suspended in an aqueous solution, and/or it may be provided to a solution containing one or more reagent(s) used in the method, such as to a solution containing one or more leaching agent precursor(s). The material may be provided before the leaching solution is obtained or it may be provided to the leaching solution which is obtained with the method described herein, in the same container or in a different container. The material may be provided at once, at several times during the method, or continuously. The method may be carried out as a batch method or as a continuous method. The material may be distributed at a length of a treatment area, for example in a case of a tubular reactor, and the leaching solution may be circulated or flowed through the treatment area. Alternatively the material may be circulated or moved though the leaching solution in a reactor, for example as unit doses or as a continuous form. A mixing may be provided to the leaching solution, for example by using one or more mixing means.

The method also comprises providing leaching agent precursor. The leaching agent precursor may be provided as dry and/or solid matter or in an aqueous solution. A leaching agent precursor solution may be formed at a first location, such as in a container or a reactor, and it may be reacted into leaching solution at the first location or at a second location, such as a different container or a reactor. The leaching agent precursor solution may be combined with a solution containing reactive species, such as solution containing hydrogen peroxide, which solution is formed by using the external energy, or the leaching agent precursor may be present in the solution which is treated with the external energy. The leaching agent or formed leaching agent precursor solution may be provided in or to a reactor, which comprises a container including one or more components of the device disclosed herein. The method may comprise providing the reactor, or the device disclosed herein, which may be also called as a system. The device may comprise means for receiving the leaching agent precursor, which may be means for receiving dry and/or solid matter or means for receiving aqueous solution. The reactor or other container may be arranged to receive the leaching agent precursor. A reactor may comprise an input and/or an output. The input may be used for inputting the aqueous solution, which may be any of the aqueous solution disclosed herein, and/or for inputting the material to be treated or one or more reagent(s) or other agent(s), or water. The reactor may contain one or more input(s). It is also possible to introduce material from the top of the reactor, especially if it is open and/or if it can be opened. The reactor may contain one or more output(s). The output(s) may be used for outputting used leaching solution and/or treated material. The output(s) and/or input(s) may be at any location of the reactor, and they may include one or more aperture(s), tube(s), valve(s), which may be opened and/or closed and preferably controlled by using one or more actuator(s) connected to one or more control unit(s) or controlling means. The output 15 may be at the bottom of the reactor, such as shown in FIG. 1. The reactor may be open or it may be sealable or equipped with a lid or other means for closing or sealing the reactor.

The method comprises providing one or more source(s) of external energy 10. The source of external energy 10 may be provided and/or placed to direct the energy to the aqueous solution 14, which may be water or a solution containing one or more agent(s), such as an aqueous solution of leaching agent precursor, or to a container or a reactor containing said aqueous solution. The source of external energy 10 may be placed above the surface 16 of the aqueous solution 14, i.e. the source of external energy is not in contact with the aqueous solution, but there may be a gap of for example 1-50 mm, such as 1-10 mm or 1-5 mm, as shown in FIG. 1. Alternatively the source of external energy may be placed to the aqueous solution, i.e arranged to be immersed to the aqueous solution. In some cases a part of the source of external energy 10 is partly in the solution and partly above the solution. In some cases the source of external energy is placed in the wall(s) of the reactor, such as presented in FIGS. 3 and 4, or even at the other side of the wall of the reactor from the aqueous solution. The source of external energy may be fixed or it may be movable, in which case it may be moved or immersed into the solution or reactor and/or moved out from the solution or reactor.

The external energy is not chemical energy, i.e. it is not based on adding one or more chemical(s). The external energy is capable of forming reactive molecular species, such as radicals in the aqueous solution, which in turn are capable of forming and/or accelerating formation of higher oxidation states in molecules. Therefore reactive species are formed, which leads to formation of for example hydrogen peroxide and/or other reagent(s) capable of reacting with the leaching agent precursor(s) to form leaching agent(s). Also these reagents may be reactive species. Especially the external energy is provided in form and/or with intensity or power high enough to form such reactive species in the aqueous solution. Preferably the external energy is not electrolytic energy which does not involve plasma formation, as such conventional electrolysis does not provide required reactive species formation. The external energy is provided by using a device providing the energy to the aqueous solution, such as a device comprising one or more source(s) of external energy, which makes the system simple and controllable. The device is electrically operated and may be controlled electronically, which enables providing an automated system. The device may be placed to a suitable location and directed to provide the energy to the solution. This also enables providing a device setup which is ready to be used and does not rely on adding external chemicals. The device may or may not be in contact with the aqueous solution during the use.

The external energy may be ultrasound, plasma, corona, glow-discharge electrolysis, contact glow discharge electrolysis (CGDE), or UV light, or in a form thereof, or the external energy is arranged to provide ultrasound, plasma, corona, glow-discharge electrolysis, contact glow discharge electrolysis, or UV light. The source of external energy may be a source of ultrasound, a source of plasma, a source of corona, a source of glow-discharge electrolysis, a source of contact glow discharge electrolysis, a Tesla coil or a source of UV light, such as an UV lamp. In one example the source of external energy is selected from a source of ultrasound and a source of plasma or corona.

The device comprises
- a reactor 11 arranged to receive the waste material and aqueous solution 14, and
- one or more source(s) of external energy 10 arranged to provide external energy to the aqueous solution in the reactor. This is arranged to be carried out to form reactive species, such hydrogen peroxide, capable of reacting with the leaching agent precursor to form a leaching agent and to obtain a leaching solution. The source of external energy 10 may be a device, such as electrical device, which is positioned or arranged to provide the energy to the reactor or to a solution in the reactor. The device may be operatively connected to the one or more control unit(s) 13, and it may be arranged to be controlled by the control unit(s). The control unit may be a separate control unit which may be at a different location, as shown in FIG. 1, or it may be embedded in the device acting as the source of energy. The control unit may be connected to one or more meter(s) or sensor(s) 17, 18, 19 monitoring the aqueous solution which is treated by the external energy, as disclosed herein. The device may contain one or more cooling means arranged to cool the aqueous solution in the reactor. The cooling means may be operatively connected to one or more controlling means and/or control unit(s).

The device may further comprise one or more sources of ozone, such as one or more ozone generator(s), arranged to provide ozone to the aqueous solution in the reactor, i.e. to the reactor. An ozone generator may be based on UV, corona discharge, electrolysis or cold plasma technology. For example a high frequency high voltage cold plasma or cold corona discharge generator may be used, for example comprising an ozone chamber made of high quality steel and molten pure quartz crystal, wherefrom the ozone may be conducted into the solution. By the ozone provided by the ozone generator it is possible to form redox pairs (redox couples) and/or reagents capable of further oxidizing the metals or rare earth metals. The ozone source may be used to support the sonochemical methods. The source of ozone may be operatively connected to one or more controlling means and/or control unit(s).

The device may also comprise a redox meter or sensor 17 arranged to monitor the redox potential of the aqueous solution. As feedback to the measurement the device may be arranged to adjust the reactions in the aqueous solution, for example by adjusting the one or more source(s) of external energy 10 to maintain desired level of reactions in the aqueous solution, and/or to add one or more chemical(s) to the aqueous solution, and/or to adjust mixing, flow and/or temperature of the aqueous solution. The redox meter or sensor may be operatively connected to one or more controlling means and/or control unit(s) 13.

The device may also comprise a pH meter or sensor 18 arranged to monitor the pH of the aqueous solution. As feedback to the measurement the device may be arranged to adjust the pH, for example by adjusting the one or more ultrasound generator(s) to maintain desired level of sonochemical reactions in the aqueous solution to adjust the pH of the aqueous solution. The pH meter or sensor may be operatively connected to one or more controlling means and/or control unit(s) 13.

The device may also comprise a conductivity meter or sensor and/or a temperature meter or sensor 19. Also these meters or sensor may be operatively connected to one or more controlling means, and as a feedback to measured value(s) the device may be arranged to adjust any of the features, parameters, devices or actuators disclosed herein to obtain or maintain a desired function of the method or the device. The meters or sensor may be fixed or they may be movable.

The device may comprise one or more mixer(s) and/or pump(s) arranged to convey the aqueous solution into and/or from the reactor, and/or to mix the solution. A mixer (12) may comprise one or more mechanical mixer(s), such as one or more blade(s), rotor(s), or the like coupled to one or more actuator(s) arranged to operate the mixer(s). The actuator(s) may be operatively connected to one or more controlling means and/or control unit(s).

The device may comprise one or more source(s) of transferring force targetable to the metal-containing material, such as to a unit dose of the metal-containing material, wherein the transferring force is arranged to transfer the metal-containing material in the reactor and/or a transfer tube connected to the reactor. The source(s) of transferring force may be used to transfer, move or displace the material to be processed in the system. The source of the transferring force may be for example a source of pressure or vacuum, such as a pressure tank, a compressor or a fan, a mechanical conveyor, or a source of magnetic field. In one example the system comprises a pneumatic tube system as a transferring force or system. In one example the system comprises a conveyor belt as a transferring force or system. The source(s) of transferring force may be operatively connected to one or more controlling means and/or control unit(s).

The device may comprise one or more container(s) comprising means for recovering metal connected to the reactor, wherein the treated aqueous solution is arranged to be conveyed to the container.

The method may comprise treating the aqueous solution with the external energy to form reactive species, such as radicals and the like, forming hydrogen peroxide. Such a method provides a direct synthesis of hydrogen peroxide from energy-water interactions. The aqueous solution may be mixed during the treatment, such as by using one or more mixer(s), stirrer(s), agitator(s) or the like mechanical mixing means or otherwise providing mixing force to the solution. The method may comprise maintaining a desired temperature, such as by cooling the aqueous solution, preferably with one or more cooling means, to maintain the desired temperature. A desired temperature may be 100° C. or less, 90° C. or less, 80° C. or less, 70° C. or less, 60° C. or less, 50° C. or less, 40° C. or less or ° C. or less. Temperatures in the range of 0-70° C., 10-60° C., 10-50° C., 20-60° C., 20-50° C. or 20-40° C. may be used, for example in cases wherein formation of fumes is to be avoided.

By providing external energy to water or aqueous solution, it is possible to obtain reactive species, more particularly reactive molecule species or reactive molecules, which may be oxidative or reactive oxygen species or other oxidative or reactive species, such as chlorine species or other species obtained by first providing these species. The reactive species may be reactive oxygen species, such as radicals, for example hydroxyl radicals ($\cdot$OH), hydroperoxyl radicals (HOO$\cdot$), and hydrogen peroxide ($H_2O_2$) (reactions 1-5). These reactions may be obtained with different types of external energy. The reactive species may be used to obtain further reactive agents.

$$H_2O \rightarrow H\cdot + \cdot OH \quad (1)$$

$$O_2 \rightarrow 2O \quad (2)$$

$$H\cdot + O_2 \rightarrow \cdot OOH \quad (3)$$

$$O + H_2O \rightarrow 2\cdot OH \quad (4)$$

$$H\cdot + O_2 \rightarrow \cdot OH + O \quad (5)$$

The hydroxyl radical exhibits a high oxidation potential and can oxidize organic substrates directly, causing their degradation or mineralization. The hydroxyl radicals have a very short lifetime, and they tend to combine with one another to form $H_2O_2$, which is released to the aqueous solution or medium (reactions 6 and 7).

$$2\cdot OH \rightarrow H_2O_2 \quad (6)$$

$$2\cdot OOH \rightarrow H_2O_2 + O_2 \quad (7)$$

The radicals and hydrogen peroxide obtained in these reactions are reactive species, more particularly reactive oxygen species, which are capable of reacting with other molecules, such as with the leaching agent precursor(s) to form leaching agent(s). The formation of leaching agent(s) in the aqueous solution causes formation of a leaching solution.

The obtained hydrogen peroxide may be used in further reactions to obtain leaching agent(s) from a leaching agent precursor. This is explained herein with a reference to iodate, but other suitable agents capable of forming a leaching agent may be used. The leaching agent precursor preferably does not comprise final leaching agent(s), but it comprises one or more agent(s) which is/are not the final leaching agent(s) of the method. The leaching agent may be obtained from the leaching precursor. The method comprises reacting the leaching agent precursor with the hydrogen peroxide to form a leaching agent and to obtain a leaching solution The "leaching agent" refers to one or more agent(s) which can be used in leaching process of metals or rare earth metals. Leaching agent may provide one or more redox pair(s), which also may be considered as reactive species. The leaching agents may be provided in an aqueous solution, which is a leaching solution. The leaching solution may contain X-Y % (w/w) of the leaching agent(s).

The leaching agent precursor may contain iodine material, such as iodide material and/or iodate material. Iodide material comprises compounds capable of forming iodide in an aqueous solution, such as triiodide. Iodide material may comprise iodide salt, such as potassium iodide KI or potassium iodate $KIO_3$.

In one example potassium iodide (KI) is provided as a leaching agent precursor. When aqueous solution of potassium iodide is irradiated or treated with the external energy, oxidation occurs and $I^-$ ions are oxidized by the generated radicals to give $I_2$. The excess of $I^-$ ions present in solution react with $I_2$ to form $I_3^-$. Therefore in the reactions (8-12) iodide ion ($I^-$) reacts with hydrogen peroxide ($H_2O_2$) to form a triiodide ($I_3^-$) ion. The amounts of $I_3^-$ ions can be quantified by UV spectrophotometer at about 350 nm. The concentration of $H_2O_2$ generated in the process can be determined using iodometric method. In one example the leaching agent comprises triiodide.

$$H_2O_2 + 2I^- + 2H^+ \rightarrow I_2 + 2H_2O \quad (8)$$

$$\cdot OH + I^- \rightarrow OH^- + I \quad (9)$$

$$I + I^- \rightarrow I_2^- \quad (10)$$

$$2I_2^- \rightarrow I_2 + 2I^- \quad (11)$$

$$I_2 + I^- \rightarrow I_3^- \quad (12)$$

Further, the ·OH radicals may oxidize iodide into triiodide $I_3^-$:

$$2\cdot OH + 3I^- \rightarrow 2OH^- + I_3^- \quad (13)$$

Therefore, it is possible to controllably obtain compounds and adjust the concentration thereof in a solution by controlling the function of one or more source(s) of external energy. It is possible to obtain information from the solution, for example by providing one or more pH and/or redox meter(s) and/or measuring device(s) based on UV spectroscopy in the solution, preferably operating in continuous mode, which may be used to obtain measurement data. The data may be used for arranging a feedback control circuit, which may be arranged to control the function, of the one or more source(s) of external energy. One or more of such controlling actions may be carried out to obtain a desired reaction rate and/or to obtain a desired and/or optimal concentration of leaching agent(s) in the solution, such as concentration of redox pair(s), for example $I_2^-/I_3^-$. In such way it is possible to obtain an optimal chemical concentration, consumption and/or solubilization rate to release the desired metal(s) or rare earth metal(s) from the raw material.

The method comprises reacting the metal-containing material with the leaching solution to obtain soluble metal complexes, and recovering the metal complexes For example, gold may be released and solubilized from raw material by using $I^-$ and $I_3^-$ present in the solution into $AuI_2^-$ and $AuI_4^-$ with the reactions 13-17. The same principle may be applied to other metals and rare earth metals as well.

$$Au + 2I^- \rightarrow AuI_2^- + e^- \quad (14)$$

$$Au + 4I^- \rightarrow AuI_4^- + 3e^- \quad (15)$$

$$I_3^- + 2e^- \rightarrow 3I^- \quad (16)$$

Iodine-iodide reactions in leaching of gold may be presented with reactions 16 and 17.

$$2Au + I_3^- + I^- \rightarrow 2AuI_2^- \quad (17)$$

$$2Au + 3I_3^- \rightarrow 2AuI_4^- + I^- \quad (18)$$

In one example silver is leached according to the principle disclosed in previous. Also other metals or rare earth metals discussed herein may be leached by using these or analogous reactions.

In one example an additional reactive ligand is provided for binding the metal of interest. Hydrogen peroxide or other suitable reactive species may act as an oxidant. One example of such a ligand is pyridine-4-thiol (4-PSH), for example in organic solution such as dimethylformamide. Dissolution of Au proceeds through several elementary steps: isomerization of 4-PSH to pyridine-4-thione (4-PS), coordination with $Au^0$, and then oxidation of the $Au^0$ thione species to $Au^I$ simultaneously with oxidation of free pyridine thione to elemental sulfur and further to sulfuric acid. The final dissolution product is a $Au^I$ complex bearing two 4-PS ligands and $SO_4^{2-}$ as a counterion. The ligand is crucial as it assists the oxidation process and stabilizes and solubilizes the formed Au cations.

The leaching agent precursor may also contain halogen material, such as bromine material or chlorine material. Halogen material may be added as a sodium salt or a potassium salt. Examples of halogen material include chloride salt and bromide salts, such as potassium chloride and/or sodium chloride or potassium bromide and/or sodium bromide. The leaching agent precursor may also contain boric compound, such as boric acid. The obtained redox pair may be $Br_2$ and $Br^-$ when bromine material is used and $Cl_2$ and $Cl^-$ when chlorine material is used.

In general, the leaching agent precursor may comprise one or more agent(s) selected from halogens and pseudo-halogens, metal complexes, organic metal-free redox pairs, interhalogen molecules, cobalt complexes and transition metal redox pairs.

Examples of halogens and pseudo-halogens include I, Cl, Br, F and polyatomic analogues of halogens for example with cyano group, such as redox pairs $I^-$ and $I_3^-$, $Cl_2$ and $Cl^-$, $Br_2$ and $Br^-$, $Br^-$ and $Br_3^-$, and several pseudo-halogen redox mediators such as redox pairs $SeCN-/(SeCN)^{3-}$ and $SCN/(SCN)^{3-}$.

Examples of metal complexes include a Co(II/III) tris (bipyridyl) redox pair, Ni(III)/(IV) bis(dicarbollide) and $[Cu(dmp)2]^{1+/2+}$ and a ferrocene/ferrocenium redox pair.

Examples of organic metal-free redox pairs include the thiolate and thiourea based redox mediators such as thiolate/disulfide $(T^-/T_2)$ redox pair, 123 2-mercapto-5-methyl-1,3,4-thiadiazole and its disulfide dimer $(McMT^-/BMT)$ and tetramethyl formaminium disulfide/tetramethylthiourea $(TMTU/TMFDS^{2+})$; and tetramethylpiperidin-N-oxyl (TEMPO) and 2-azaadamantan-N-oxyl.

Interhalogen molecules may be based on $IBr^{2-}$ and $I_2B^{r-}$.

Examples of cobalt complexes include Co(II/III) tris (bipyridyl) redox pair, $[Cu(dmp)2]^{1+/2+}$, ferrocene/ferrocenium redox pair, cobalt complexes including terpyridine, bipyridine, and phenanthroline, based on $[Co(dtb)3]^{2+/3+}$.

It may be necessary to adjust the pH of the solution to obtain optimal conditions for forming reactive species with the external energy. For example the method may comprise lowering the pH of the aqueous solution, for example by adding acid, such as weak acid. The pH may be lowered below 6, 5, 4 or 3, such as to a range of 0-5, 1-5, 0-3 or 1-3. The acid may be for example citric acid, hydrochloric acid or other suitable acid.

The method may also comprise providing one or more chemical oxidant(s), such as hypochlorite, hydrogen peroxide, persulfate such as potassium monopersulfate, potassium persulfate, or sodium persulfate, ozone, haloalkane(s), such as chloroalkane(s), for example carbon tetrachloride ($CCl_4$), chloroform ($CHCl_3$) or dichloromethane ($CH_2Cl_2$), or other materials preferably capable of oxidizing iodide to iodine or facilitating it, to the aqueous solution. The chemical oxidant may also be treated with the external energy. Haloalkanes may be added to provide chlorine radicals $Cl^-$ when treated with the external energy. Especially chloroalkanes may be used for improving the efficacy of acoustic cavitation or other reactions utilizing external energy. The chlorine radicals also take part in the desired reactions, such as the oxidation process, and intensify the rates. For example chlorine radicals may be formed to obtain iodide redox pairs.

Ozone may be provided by providing a source of ozone, such as an ozone generator, and providing ozone to the aqueous solution with the source of ozone, such as ozone generator. It is possible to facilitate the initiation of the hydrogen peroxide formation reaction by adding ozone or other radical-forming agent, and the process may be thereafter run only or mainly using the external energy, as described herein. The chemical oxidant, such as ozone, or chlorine radicals, may be provided at an initiation phase, or additionally at a later phase, if required, preferably for a relatively short time period, such as for 1 second to 10 minutes, for example 1-300 seconds or 1-60 seconds. After the reaction has been initiated or started, it can be maintained using the external energy as described herein.

When ozone is used with potassium iodide the following reactions (19, 20) may occur.

$$2KI + O_3 + H_2O \rightarrow I_2 + O_2 + 2KOH \quad (19)$$

$$I_2 + I^- \rightarrow I_3^- \quad (20)$$

When the solution contains excess potassium iodide the iodine reacts with iodide ion to produce triiodide ion. With the ozone the obtained $I^-$ and $I_3^-$ will oxidize gold with the principles presented in reactions 14-18. It is also possible to provide potassium iodate ($KIO_3$) or iodine (I) at the initiation phase to achieve a quick start.

Gold forms a complex with bromide and chloride as presented in reactions 21 and 22. With the compounds obtained with the previously presented ultrasonically obtained radicals and sonochemical reactions by using sodium chloride and/or hypochlorite it is possible to obtain gold leaching and gold complex producing compound trichloride ion $Cl_3^-$. To maintain the stability of the gold chloride complex it is necessary to control the pH accurately as the gold leaching rate slows down at pH 1.5-4, so it may be preferable to adjust the pH below 3 to obtain preferable conditions to obtain desired trichloride ion concentration.

$$2Au + 3Br_2 + 2Br^- \rightarrow 2(AuBr_4)^- \quad (21)$$

$$2Au + 3Cl_2 + 2Cl^- \rightarrow 2(AuCl_4)^- \quad (22)$$

If the redox potential of the solution lowers too much, the complex will dissociate, and the gold will precipitate. This is not desired at the leaching phase. Therefore the solution must have an adequate concentration of free oxidant, which may comprise chlorine, bromine or iodine when halogens are used. In such case the method may comprise providing chemical oxidant. Instead of chlorine also hypochlorite can be used and therefore the concentration of bromine and/or iodine in the solution can be lowered. The equilibrium of the complex can be adjusted by adjusting the pH of the solution, the concentration of the halide or other chemical oxidant, and/or redox potential.

In addition to the leaching of precious metals, also other metals are solubilized to the leaching solution, such as copper and iron. For example copper will form a $CuI_2$ complex which is not stabile and will be reduced to $CuI$ according to reaction 23.

$$2Cu_2 \rightarrow 2CuI \downarrow + I_2 \downarrow \quad (23)$$

The oxidation of iodine may be enhanced, if necessary, by adding organic chlorine compound to the aqueous solution, such as $CCl_4$, wherein $Cl^-$ radicals and $Cl_2$ will be released in large amounts thus increasing the oxidation rate of iodide. Alternatively chloral hydrate $CCl_3CH(OH)_2$ may be used for enhancing the oxidation of iodide.

To maintain stable optimal reactions and reaction rate(s) the acid-base equilibrium (pH) and redox potential (Eh) may be controlled and/or adjusted. These may be illustrated by using a Pourbaix diagram. The formation of gold complexes $AuI_2^-$ and $AuI_4^-$ takes place when the solution has a suitable concentration of $I^-$ and $I_3^-$ and the pH and the redox potential are in a suitable range. The pH of an aqueous KI solution is maintained at a neutral pH range during the solubilization phase. For example the stability of $AuI_2^-$ gold iodide complex weakens when the pH rises close to 12, and a stabile range can be selected at pH 5-8. The redox potential, more particularly voltage or Eh value, can be adjusted with the ultrasound, and optionally also with the source of chemical oxidant(s), such as ozone, especially with an ozone generator. The stabile voltage range will narrow when the pH rises. For a gold complex optimal stabilization can be achieved when the Eh voltage is adjusted to the range of 0.5-1.1 V, such as about 0.7 V.

The method may comprise adjusting the pH of the aqueous solution to a desire range, such as in the range of 3-10, such as in the range of 4-8 may be used, or in the range of 5-8. The desired range may be a range wherein the formation of the metal complex or the rare earth metal complex is most optimal and/or stable. The pH may be adjusted by adding one or more pH adjusting agent, which may be acid or base, for example weak acid or base, such as citric acid or oxalic acid, to the aqueous solution. The pH may be also buffered by providing one or more buffering agent(s). The pH of the solution may be monitored by using one or more pH meter(s), and as a feedback an automated system may be configured to carry out one or more actions to adjust the pH of the solution to obtain a desired pH or a pH in the desired range.

The pH may be adjusted by treating the aqueous solution with ultrasound to form reactive species sonochemically from water or aqueous solution, for example by using proton exchange membrane (PEM), anion exchange membrane (AEM) or bipolar membrane (BPM), to generate $H^+$ and/or $OH^-$ ions. It is possible to separate the obtained $H^+$ and/or $OH^-$ ions by using such membranes, and then utilize the separated ions for adjusting the pH. Formation of undesired gases or other reactions caused by electron transfer can be avoided. Further, there is no need to add any additional acidic or basic chemicals. The system may comprise means for separating $H^+$ and/or $OH^-$ ions, preferably by using one or more of said membrane(s), and for dosing said separated $H^+$ and/or $OH^-$ ions to the aqueous solution to obtain a desired pH. In this way there is no need to add any additional reagent(s) to the aqueous solution, which makes the system and method simpler, more economical and the use of possibly harmful chemicals can be avoided.

With H+ ions it is possible to lower the pH of the solution, for example to stabilize the formation of the complexes. With $OH^-$ ions it is possible to raise the pH of the solution. In the precipitation phase it is also possible to raise or lower the pH to a desired value, and/or after the precipitation it is possible to change the pH back to the original value or range which would be optimal for the solubilization.

The method may comprise adding a mixture of oxygen and argon to the aqueous solution. This was found to enhance the sonochemical formation of reactive species, such as hydrogen peroxide, especially when compared to oxygen or argon alone. For example too high oxygen content may decrease the formation of hydrogen peroxide. The oxygen-argon mixture may be provided as containing 20-30% (v/v) oxygen and 70-80% (v/v) argon.

The device disclosed herein, which may be also called as a system, a device setup or a device arrangement, for recovering metal from waste material by leaching, may be an automated setup or system, such as semi or fully automated, and/or electronically controlled. The setup may contain one or more controlling means arranged to monitor and control the setup. The controlling means may comprise one or more control unit(s). A control unit may include one or more processors, memory, user interface, display, keyboard, power connection, one or more physical connectors for connecting to external computerized devices, and/or optionally network connection, such as wired or wireless connection. The control unit may contain a software configured to carry out one or more controlling actions, such as to control the devices connected to the control unit. The control unit may be connected to means for controlling and/or monitoring the one or more source(s) of external energy, such as ultrasound generator(s), plasma source, corona source, and/or one or more ozone generator(s), one or more redox meter(s), one or more pH meter(s), one or more mixer(s), one or more pump(s), one or more valve(s), one or more device(s) for providing one or more chemical(s) to the reactor and/or to the second container, one or more heater(s) or cooler(s), one or more actuator(s), and/or one or more means for recovering metal complexes, or other device(s). The control unit may be arranged to control said devices as a feedback to one or more detected and/or measured value(s) to maintain the temperature, oxygen content, pH, flow speed of liquid, or chemical content at a desired level, such as at a predetermined range. The control unit(s), device(s), sensor(s) and other electronic components are connected by wiring and/or they may be wirelessly connected. The system is connected to a power source, such as a to power network, to provide power for the energy source(s), electronics, meter(s), actuators, pumps or the like devices and components. The system may be arranged to automatically carry out one or more of the methods or method steps disclosed herein.

One example provides a device for recovering metal from metal-containing material by leaching, the device comprising at least one transfer tube arranged to receive metal-containing material, such as a unit dose of the metal-containing material, at least one reactor arranged to receive the metal-containing material and leaching agent precursor in an aqueous solution, at least one source of transferring force targetable to the metal-containing material, such as to the unit dose of the metal-containing material, wherein the transferring force is arranged to transfer the metal-containing material in the transfer tube, wherein the at least one transfer tube is connected to the at least one reactor to transfer the metal-containing material via the transfer tube to the reactor, one or more ultrasound generator(s) arranged to provide ultrasound to the aqueous solution in the reactor to form reactive species sonochemically from the leaching agent precursor to form a leaching solution, a redox meter 17 arranged to monitor the redox potential of the aqueous solution and as a feedback to the measurement arranged to adjust the one or more ultrasound generator(s) to maintain desired level of sonochemical reactions in the aqueous solution.

The device may comprise one or more treatment zone, which may be in the reactor or in the tube. The treatment zone may comprise perforation, aperture(s) or one or more other permeable area(s) to allow the aqueous solution to pass. The treatment zone may be arranged to be closed and opened. The material transferred in the tube may be treated with the aqueous solution at the treatment zone. Alternatively the metal-containing material, such as the unit dose of the metal-containing material, may be transferred to the reactor from the tube. The material may be treated in the reactor, and after the treatment it may be transferred from the reactor.

The source of the transferring force may be selected from source of pressure or vacuum, such as a pressure tank, a compressor or a fan, mechanical conveyor, and a source of magnetic field. In one example the system comprises a pneumatic tube system.

The device may comprise one or more diverter(s), for example connected to the tubes, which are arranged to change the position, direction and/or the route of the material, such as material as a unit dose. The tubing may be branched in a diverter. The diverter(s) may be connected to two or more transfer tube to transfer the material to a desired transfer tube.

One example provides a method for recovering metal from metal-containing material by leaching, the method comprising providing the device described in previous,
providing leaching agent precursor in an aqueous solution,
providing a source of ultrasound to the aqueous solution,
treating the aqueous solution with the external energy to form reactive species, such as hydrogen peroxide,
reacting the leaching agent precursor with the reactive species, such as with the hydrogen peroxide, to form a leaching agent and to obtain a leaching solution
providing metal-containing material, such as a unit dose of the metal-containing material,
placing the metal-containing material, such as the unit dose of the metal-containing material, to the transfer tube,
subjecting the metal-containing material to the transferring force to move it to the reactor,
reacting the metal-containing material, preferably in the reactor, with the leaching solution to obtain soluble metal complexes, and
recovering the metal complexes.

The metal-containing material may be provided as a unit dose, wherein the metal-containing material may be in a crushed or pulverized form. The unit dose may comprise the metal-containing material in a transfer capsule, such as a perforated transfer capsule. Alternative the unit dose comprises metal-containing material which is not in a transfer capsule. In such case the unit dose may comprise metal-containing material as a solid entity, which may be packed or bagged, for example comprising a surrounding structure, which is permeable to the aqueous solution. The surrounding structure may comprise a net, wire, thread, tape, a bag or the like bonding structure.

Ultrasound (Sonochemical Method)

The source of external energy may be ultrasound, wherein the method utilizes sonochemical reactions. Sonochemistry refers to use of ultrasound in chemical reactions in solution to provide activation based on a physical phenomenon called acoustic cavitation. Cavitation is a process in which mechanical activation destroys the attractive forces of molecules in the liquid phase. When applying ultrasound, compression of the liquid is followed by rarefaction (expansion), in which a sudden pressure drop forms small, oscillating bubbles of gaseous substances. These bubbles expand with each cycle of the applied ultrasonic energy until they reach an unstable size; they can then collide and/or violently collapse. The collapse of bubbles can be violent enough to lead to chemical effects, known as sonochemistry. These bubbles act as a localized hot spot generating temperatures of about 4000 K and pressures in excess of 1000 atmospheres.

When water, or aqueous solution, is sonicated, adiabatic collapse of cavitation bubbles leads to the formation of reactive oxygen species or other reactive species, such as radicals, for example hydroxyl radicals (·OH), and hydroperoxyl radicals (HOO·), and hydrogen peroxide ($H_2O_2$) (reactions 1-5).

When an aqueous solution is irradiated ultrasonically, OH radicals and H radicals are produced by cavitation in a sonolysis. The hydroxyl radicals combine with one another to form $H_2O_2$, which is released to the aqueous solution or medium according to reactions 6 and 7.

According to the principal disclosed in previous, when aqueous solution of potassium iodide is irradiated with ultrasound, i.e. sonicated, oxidation occurs and I⁻ ions are oxidized by the generated radicals to give $I_2$. The excess of I⁻ ions present in solution react with $I_2$ to form $I_3^-$. Therefore in the reactions (8-12) iodide ion (I⁻) reacts with hydrogen peroxide ($H_2O_2$) to form a triiodide ($I_3^-$) ion. The amounts of $I_3^-$ ions can be quantified by UV spectrophotometer at about 350 nm. The concentration of $H_2O_2$ generated during sonication can be determined using iodometric method. In one example the leaching agent comprises triiodide.

It is possible to controllably obtain compounds and adjust the concentration thereof in a solution by controlling the function of one or more source(s) of ultrasound, such as frequency, intensity (W/cm²), duty cycle, length of radiation time and/or pulse form. It is possible to obtain information from the solution, for example by providing one or more pH and/or redox meter(s) and/or measuring device(s) based on UV spectroscopy in the solution, preferably operating in continuous mode, which may be used to obtain measurement data. The data may be used for arranging a feedback control circuit, which may be arranged to control the function, such as frequency, intensity (voltage and/or currency), duty cycle, length of radiation time and/or pulse form at different duty cycles or continuous mode, of the one or more source(s) of ultrasound. One or more of such controlling actions may be carried out to obtain a desired reaction rate and/or to obtain a desired and/or optimal concentration of leaching agent(s) in the solution, such as concentration of redox pair(s), for example $I_2^-/I_3^-$. In such way it is possible to obtain an optimal chemical concentration, consumption and/or solubilization rate to release the desired metal(s) or rare earth metal(s) from the raw material.

In one embodiment the device comprises
a reactor arranged to receive the waste material and leaching agent precursor in an aqueous solution, and
one or more source(s) of ultrasound, such as one or more ultrasound generator(s), arranged to provide ultrasound to the aqueous solution in the reactor.

The ultrasound generator(s) are arranged to form reactive species sonochemically from the leaching agent precursor to form a leaching solution with the method described herein. The leaching agent(s) is/are generated in situ. The device may also comprise a redox meter arranged to monitor the redox potential of the aqueous solution. The redox meter may be operatively connected to one or more controlling means. As a feedback to the measurement the device, or system, may be arranged to adjust the one or more source(s) of external energy to maintain desired level of the reactions in the aqueous solution.

The ultrasound generator may be any suitable source of ultrasound, such as piezoelectric ultrasonic transducer. The "ultrasound generator" may refer to the part producing the ultrasound, i.e. the source of ultrasound or the ultrasound radiator, but the generator setup may also include other parts which are located a separate place, such as control unit(s), power source(s), wiring, and the like. One or more of these parts may be also integrated in the ultrasound generator. The ultrasound generator may or may not be in contact with the aqueous solution during the process. For example, it is possible to place one or more ultrasound generator(s) at an outer wall of the reactor or above the liquid surface. This makes it easier to service and clean the inner surfaces of the reactor and the used chemicals do not cause corrosion, blocking or other adverse effects to the ultrasound generator.

The ultrasound may have a frequency in the range of 18 kHz-300 MHz, such as 20 kHz-100 MHz, for example 20 kHz-1 MHz. It is also possible to provide two or more ultrasound generators, or sources of ultrasound, providing ultrasound having the same or different frequency. Using two or more ultrasound with different frequencies may enhance the formation of reactive species. The two or more different frequencies may include for example a first frequency in the range of 18-60 kHz and a second frequency in the range of 300 kHz-2 MHz.

The method comprises treating the aqueous solution with ultrasound to form reactive species sonochemically from the leaching agent precursor to form a leaching solution. The sonochemical treatment produces free radicals, which in turn produce other reactive or oxidative species, such as hydrogen peroxide, to the solution. The aqueous solution is treated with a time, intensity and/or frequency required to obtain reactive species capable of enabling carrying out the method described herein.

Plasma and Corona

The external energy may be plasma, including corona and glow discharge, or the external energy may produce plasma or reaction(s) involving plasma. The formation of reactive species, such as hydroxyl radicals (·OH), hydrogen peroxide ($H_2O_2$) and hydroperoxyl radicals (HOO·), such as shown in reactions 1-5 in previous, may be similarly obtained with plasma. In addition, other reaction pathways, such as $OH+H_2O^* \rightarrow H_2O_2+H$ are possible. The reactions 6-18, as disclosed in previous, or analogous reactions, can also be obtained by using plasma.

Plasma is a state of matter in which an ionized gaseous substance becomes highly electrically conductive to the point that long-range electric and magnetic fields dominate the behaviour of the matter.

Artificial plasma can be generated by the application of electric and/or magnetic fields through a gas. More particularly plasma can be generated by applying electric current across a dielectric gas or fluid. The potential difference and subsequent electric field pull the bound electrons toward the anode while the cathode pulls the nucleus. As the voltage increases, the current stresses the material by electric polarization beyond its dielectric limit (termed strength) into a stage of electrical breakdown, where the material transforms from being an insulator into a conductor (as it becomes increasingly ionized). The underlying process is the Townsend avalanche, where collisions between electrons and neutral gas atoms create more ions and electrons. The first impact of an electron on an atom results in one ion and two electrons. Therefore, the number of charged particles increases rapidly, such as only after about 20 successive sets of collisions, mainly due to a small mean free path, which is the average distance travelled between collisions.

A direct synthesis of reactive species, such as hydrogen peroxide, by plasma-water interaction may be utilized in the methods disclosed herein. This may be carried out at an atmospheric pressure. When plasma is in contact with water, the plasma-water interactions can entail many direct reactions at the plasma-water interface and indirect cascade reactions in the bulk water. One important species at the plasma-water interface is hydroxyl radical (OH) produced by plasma-induced water reactions with electrons and ions.

More particularly, three main processes occur at the plasma-liquid interface when the liquid acts as cathode: sputtering, electric field induced ion emission and evaporation. Firstly, positive ions in the plasma passing the cathode sheath will be accelerated by the cathode voltage fall ($V_c$), and the constituents of liquid will be sputtered into the gaseous phase by the accelerated energetic ions. Secondly, the $V_c$, which may have a magnitude of about ~500 V, forms an electric field in the order of 100 kV cm$^{-1}$ near the liquid surface. This electric field is high enough to pull out the hydrated negative ions (carrying water molecules) from the liquid surface and transfer them to the gaseous plasma. Thirdly, there is evaporation at the liquid surface caused by plasma and Joule heating. All these three processes can transfer water molecules from the liquid phase into the gaseous plasma, and then the number of water molecules entering the plasma phase is influenced by the above three processes. Water molecules in the gaseous plasma can react with plasma species to form OH, and then $H_2O_2$ is formed by the combination of OH. Finally, $H_2O_2$ dissolves into the liquid to form an aqueous solution. Therefore, $H_2O_2$ production will increase with the number of water molecules entering the plasma phase which is strongly dependent on the above-mentioned processes.

If the liquid acts as anode, the cathode voltage fall is formed on the metal electrode, and therefore there is no sputtering and electric field induced ion emission at the liquid surface, and evaporation is the only way to transfer water molecules from liquid phase into the gaseous plasma.

Plasma or corona may be produced at atmospheric pressure, or at a lowered pressure. Method for producing plasma at atmospheric pressures include arc discharge, corona discharge, dielectric barrier discharge, capacitive discharge and piezoelectric direct discharge plasma. A source of gas, especially dielectric gas, may be provided. Examples of the gas include air, argon, oxygen and nitrogen gases.

Corona discharge is a non-thermal discharge generated by the application of high voltage to sharp electrode tips. A current flows from an electrode with a high potential into a neutral fluid, usually air, by ionizing that fluid so as to create a region of plasma around the electrode. The ions generated eventually pass charge to nearby areas of lower potential, or recombine to form neutral gas molecules.

The method may utilize indirect plasma, direct plasma or plasma injection technology.

Indirect method may use ultraviolet (UV) light or electron beam. A source of UV may be mercury vapor lamp, such as low pressure (LP) mercury vapor lamp, for example low-pressure high-output (LPHO) mercury vapor lamp, medium pressure (MP) mercury vapor lamp, electrode-less mercury vapor lamp, metal halide lamp, xenon lamp (pulsed UV), eximer lamp, UV laser or light emitting diode (LED). A source of electron beam may be filaments in vacuum, which provide thermal electron emission and can be accelerated by a high electric field. The emission is then conveyed through Ti or BN thin film by tunnel effects.

Direct method uses electrical discharges in water or aqueous solution. Electrical discharges may be provided in gas phase by using liquid electrode. The liquid may act as cathode or anode, i.e. positive or negative voltage may be applied to a metal electrode, such as tungsten steel electrode. The metal electrode may be applied above liquid surface, for example at a distance of few millimetres, such as 2-5 mm, for example about 3 mm, to form a gap between the liquid and the metal electrode and gas, such as argon gas, is provided between the gap.

Plasma injection method uses electrical discharges above water or aqueous solution. The discharges may be provided in gas phase with liquid electrode. DC, AC, DC glow corona, or pulsed corona may be used. Examples of such implementations include needle-to-plate. hollow needle-to-plate, mesh-to-plate, multiple needle-to-plate, wire-to-plate (pulsed corona only) and wire-to-cylinder (water layer on the inner wall, pulsed corona only). Also gliding arc may be used.

Techniques using direct liquid phase discharges (elecrohydraulic discharges), may be implemented as needle-to-plate, hollow needle-to-plat (gas injected to water, pulsed corona, pulsed spark discharge), pinhole (pulsed corona) and needle-to-needle (pulsed arc discharge). In general such electrohydraulic discharges can be divided into three categories: pulsed streamer "corona-like" discharges, glow discharges and pulsed arc discharges. Direct liquid phase discharges may be also implemented with pulsed corona and spark.

For example pulsed streamer discharge, which is a type of advanced oxidation-reduction process (AORP), utilizes an electrical discharge in the liquid and gas phases to produce highly reactive radicals (OH·, H·, O·) and molecular species ($H_2O_2$, $H_2$, $O_3$). The formation of $H_2O_2$ takes place primarily in the cathode spot region in a thin layer at the plasma-water interface due to recombination reactions of the reactive species (OH·, H·, $HO_2$·, O·, $O_2$·).

Plasma technology may be considered also including glow-discharge electrolysis technologies, wherein plasma is formed.

Glow-Discharge Electrolysis

Glow-discharge electrolysis is a form of electrolysis in which energy transfer as well as charge transfer is involved, and this serves to break up solvent molecules into reactive radicals which produce the desired chemical reactions. For example potassium iodide solution may be treated to produce hydrogen peroxide and to oxidize iodide to iodine, as described herein. Glow-discharge electrolysis and contact glow-discharge electrolysis are plasma electrolysis technologies which can be used for producing hydroxyl radicals. In contact glow discharge electrolysis (CGDE), also called as plasma electrolysis, a stable sheath of light emitting plasma develops around an electrode immersed well inside a relatively high-conductivity liquid electrolyte during normal electrolysis at several hundred volts. The phenomenon may develop in dc-, pulsed dc-, ac- as well as RF-driven electrolyses.

Recovery and Post-Processing

When the desired metal is solubilized into the leaching solution and a pregnant solution is obtained, the metal may be recovered from the solution. The pregnant solution may be conveyed to another container or place to be treated to recover the metal. The metal may be also recovered in the same container, i.e. the reactor, wherein the leaching has occurred.

The pregnant solution may be post-processed, for example to remove non-desired material, such as residual metals which are not in a soluble form. This may be carried out by filtrating the solution to remove non-soluble material. This will help decreasing the chemical consumption in the recovery phase, for example in a precipitation, saving money and enhancing the quality of the final product.

The treated material may be removed from the reactor when the metal(s) of interest is/are solubilized. This may be monitored by measuring one or more soluble chemical(s) or suspended solid(s) spectrophotometrically or using radio frequency technology from the aqueous solution. It is also possible to treat material such as circuit boards, connectors or the like wherein the metal of interest, such as gold, is as a coating on the material. When it is detected that the coating has been solubilized, the treated material may be removed from the solution so that the metal(s) below the coating is/are not solubilized, such as copper or iron. Therefore the leaching may be carried out only until the metal of interest has been solubilized, or substantially solubilized. The leaching and/or the subsequent recovery step lay be carried out continuously or as a batch process.

In one example the pregnant solution is conveyed to a second container, or to a further container, such as third or fourth container, for example via one or more tube(s) and/or aperture(s) arranged between the reactor and the second and/or further container(s). The second container, or one or more container(s), connected to the reactor may comprise means for recovering metal. The treated aqueous solution is arranged to be conveyed to the container. This may be facilitated by using one or more pump(s), mixer(s) or other devices arranged to convey the aqueous solution into and/or from the reactor.

Recovering the metal complexes may comprise any suitable method, such as electrowinning, precipitation, cementation or loading onto activated carbon, scavenger materials, and/or ion exchange resins, or a combination thereof. The second or further container may contain means for carrying out any of said recovering method. The recovering may be carried out for a time period required to recover all or substantially all of the metal(s) of interest. The means for recovering the metal complexes may comprise electrowinning means, means for providing one or more precipitation chemical(s), means for providing one or more cementation chemical(s), activated carbon, scavenger material, and/or ion exchange resin, or a combination thereof.

Electrowinning, also called electroextraction, refers to electrodeposition of leached metals from solution. A current is passed from an inert anode through the leaching solution containing the metal so that the metal is extracted as it is deposited in an electroplating process onto the cathode. Therefore in electrowinning the means for recovering metal may comprise anode, cathode and a power source connected to the anode and cathode.

The method may comprise precipitating the metal, for example by providing one or more precipitating agent(s), such as L-ascorbic acid, D-(−)-isoascorbic acid, isoascorbic acid, oxalate, glucose, sodium borohydride or hydrazine. The means for recovering metal may comprise means for providing one or more precipitating agent(s), activated carbon and/or ion exchange resin(s), such as one or more container(s) for the precipitating agent(s), one or more tuber(s) and/or valve(s) for dosing the agent(s) from the container, one or more actuator(s) for operating the valve(s), wherein the actuator(s) may be operatively connected to one or more controlling means.

The method may further comprise recycling the leaching solution back to the treatment after recovering the metal.

Scavenger Materials

The use of specific leaching agent(s) and/or other reagents may make the recovery of the leached metals challenging. For example it may be necessary to adjust the pH or other reagent content or reaction conditions to be able to apply conventional recovery methods. For example when halide-based leaching agents and thiourea are used, such problems may arise. Therefore it may be necessary to use specific scavenger materials or other activated materials to bind and recover the leached metals, especially directly from the leaching solution and preferably without using further reagents or solutions or adjustment of the reaction conditions. Such scavenger materials may be ionic scavenger materials. Recovering by using scavenger materials is fast compared to conventional methods, such as electrowinning. For example when recovering gold it may take 8 hours or more to recover the gold at the cathode by electrowinning, and still part of the gold remains in the solution, such as about 5 ppm. On the other hand when using scavenger materials the solution may be flowed though the material several times in a very short time resulting in better recovery without using electricity.

In one embodiment the means for recovering metal complexes comprises surface-treated scavenger material. Scavenger material as used herein refers to material including a reactive compound which can bind the metal of interest. Preferably the scavenger material can bind the metal from a solution, such as the leaching solution or its derivative. The scavenger material may be also called as absorber or absorbing material, or binder or binding material, and it may be called also in the present context as metal scavengers or metal scavenger materials. Such material may specifically remove the metal(s), preferably metal(s) of interest, from a system, such as a solution. The metal(s) may be removed from the scavenger material to recover the bound metals. The removing may be carried out by eluting with a suitable liquid, by mechanical methods, or by other suitable methods and/or means. The scavenger material may be disintegrated to release the bound metal(s), such as by mechanically disintegrating the material, for example by grinding, abrading and/or the like methods. Scavenger materials may be based on functionalized materials, such as plastics or the like, which may be in the form of sheets, bars, powder, granules, beads, fibers or filters. Such specific forms may be applied to different applications, different solutions and/or compositions, different metals and/or different means for recovering the metals(s).

The scavenger material may comprise polymeric base or body, such as thermoplastic polymer base or body. Examples of such polymers include polyamide, such as polyamide 12 (Nylon 12), and polypropylene. The polymer may be formulated into a desired shape of scavenger material. The means for recovering metal complexes may comprise surface-treated scavenger material in a form of a sheet, a film, a membrane, a bar, powder, a granule, a bead, a fiber and/or a filter.

The scavenger material may be provided in a casing or other support structure, for example in a cartridge, a cylinder, an open container or the like structure arranged to hold the scavenger material. The casing may be a flow-through casing. Such a casing allows flow of liquid through the casing so that the liquid will be in contact with the scavenger material inside the casing. The casing may have one or more apertures to allow flow of liquid, and/or it may be one or more inlet(s) and/or one or more outlet(s). The casing may be perforated. The casing may be arranged to be installed to a flow path of the liquid, for example to a location wherein the leaching solution is pumped or otherwise conveyed to enable flow of the solution to the casing, more particularly to the scavenger material. The casing may also include a filter or membrane, such as a semipermeable membrane, which may be located at the one or more apertures, such as at an inlet and/or at an outlet. Therefore it is possible to obtain a higher pressure inside the casing, for example by using a pump, which may enhance the effect of the scavenger material inside the casing. Such filter or membranes may also be used to recover or exclude material with certain particle size or diameter. It is also possible to control the pressure inside the casing by adjusting the size of apertures. Therefore the pressure may be adjusted or adjustable inside the casing, for example by controlling the pressure provided by the pump, controlling the size of the apertures, for example by one or more movable parts arranged to limit the aperture(s), or by other means having impact to the pressure.

The pump, any actuator(s) connected to any movable parts, and/or other means may be operatively connected to the control unit. They may be arranged to be controlled to obtain a desired pressure, flow and/or other variable, preferably to maintain such a variable in a predetermined range.

The casing may be dipped to the solution, or arranged to be dipped or otherwise contacted with the solution. The casing may be applied to the solution for a suitable time period to bind metal complexes to the scavenger material, and it may be removed from the solution for further processing, for example to elute or otherwise recover the metal from the scavenger material, for example at another location. The scavenger material may be provided to the leaching solution in analogous way without a casing, for example when in form of sheet, beads, filter or other suitable form, and/or removed from the solution.

The casing may be arranged to be opened and closed, so that the scavenger material may be inserted and/or removed. For example after the recover of metal from the leaching solution, the scavenger material containing the metal may be removed from the casing and treated to separate the metal from the material. Also new scavenger material and/or reactivated scavenger material may be inserted into the casing.

In one embodiment the means for recovering metal complexes comprises scavenger material comprising carbon nanomaterials, such as carbon nanotubes, carbon fibers or carbon nanobuds. These may be the surface-treated scavenger materials or the surface-treated scavenger materials may comprise the carbon nanomaterials.

The scavenger materials may be surface-treated or doped with one or more heteroatom(s), such as nitrogen (N), phosphor (P), boron (B) and/or sulphur (S).

The scavenger material may be surface-treated by plasma and/or laser. For example polyamide or polypropylene based materials may be surface treated, so that they are able to bind precious metals directly from a solution, such as a saturated/pregnant solution. It is not necessary to modify the pregnant solution any way. These materials, such as polyamide 12, are very inexpensive materials, readily available and can be used at acidic conditions.

The scavenger material may be provided in a flow-through filter, for example provided in a casing, as a porous filter material, or in other way as described herein. The filter may be designed to be placed to a flow path of the leaching solution, which may depend on the device or setup. For example the setup may contain a pump arranged to pump and/or circulate the leaching solution, for example via to tube, wherein the filter is arranged to be placed or placed to the flow path of the pumped solution, for example into the tube. The filter may contain a plurality of scavenger material units, such as granules, beads, powder particles, fibers, filter(s) and/or the like.

If the scavenger material is provided as material particles having relatively small dimensions, such as powder, small beads or other particles having a diameter less than 1 mm, or less than 0.1 mm, such as an average particle diameter in the range of 10-200 µm, such as 1-100 µm, it is possible to obtain a very high surface area in a small volume. However, it may be challenging to handle the material, to provide suitable form of material enabling adequate flow through of solution and/or recovery of the material. This would require a filtration system to recover the particles, so the material may be packed in a suitable filter casing, such as a flow-through casing. To obtain scavenger material having a large surface area, in similar way when small particles are used, but also good flow-through properties, it is also possible to use additive manufacturing (3D printing) to prepare scavenger material in a form of interconnected particles. The particles are therefore in a form of a column or a mesh, which may be a single object but provides porosity which can enable high flow-through of solution.

Additive manufacturing may be used to obtain complex 3D structure of scavenger material or material comprising the scavenger material, which provide desired mechanical properties, such as elasticity, flexibility, rigidity, and the like, or materials combining the properties or having different parts exhibiting different properties. The mechanical properties may also facilitate assembly of a final product, which may comprise scavenger material packed in a casing. The structures may also enable high flow-through of aqueous solution. The scavenger material may comprise or be based on plastic polymer(s), such as polyamide or derivative thereof. The scavenger material, preferably fully or partly obtained by additive manufacturing, may comprise one or more types of parts or structures, such as film, sheet, bar or the like, which may be multi-layered, and/or which may include fibers, interlayer structures (spacers), grooves, ridges, pores, apertures and the like, or combinations thereof. Elastic sheets or films may be rolled or otherwise folded into forms which may be packed in a casing. Such structures provide large surface area and good flow properties for the solution to be treated. The material may contain elastic hinge parts which facilitate the folding and assembly. The initial form may be continuous, i.e. uninterrupted. After forming by additive manufacturing, the initial form may be surface treated with the methods disclosed herein, for example on a conveyor or if the material sheet or film is unrolled from a first roll, surface-treated, and preferably then rolled into a second roll. Because of the continuous structure the scavenger material may be activated easily. For example, if plasma activation is integrated in a casing, the plasma may be conveyed into the 3D structure, which may be porous, so it would not be necessary to disassemble the filter casing to reactivate the material.

American Society for Testing and Materials (ASTM) group "ASTM F42—Additive Manufacturing", has formulated a set of standards that classify the range of Additive Manufacturing processes into 7 categories. These include VAT photopolymerization, material jetting, binder jetting, material extrusion, powder bed fusion, sheet lamination and directed energy deposition. One or more of these methods may be utilized, depending on the desired final product and used material(s). However if the material is based on plastic polymers, it may limit the useful methods.

Additive manufacturing may be used to prepare composite materials, such as nanocomposite materials. Such materials may be composites of two or more materials disclosed herein, for example the hybrid materials, the doped, coated and/or deposited materials, functionalized materials and/or other materials and combinations thereof. In one example the nanocomposite materials comprise carbon-based materials, such as carbon nanotubes or graphene and derivatives thereof, for example with polybutylene terephthalate (PBT). Electrically and thermally conductive polymer nanocomposites can be obtained. Such composite materials may be printed with commercially available 3D printers, which makers the manufacture thereof inexpensive and relatively simple. Therefore low-cost functional objects may be obtained with high conductivity, mechanical properties and other properties.

When spacers or the like intermediate parts between sheet, films or the like parts providing large surface areas are used, the mixing, cycling and reacting of the solution in the process is enhanced. Also other porous structures or surface shapes facilitate these functions. Efficient mixing has an impact to the thickness of boundary layer formed by the solution. When the boundary layer is as thin as possible, the polarization effect is reduced as matter transfer is enhanced. The spacers should enhance the flow and provide mechanical support. The spacer should be in contact with the sheets or films as little as possible. Such structures can be effectively obtained by using additive manufacturing. Especially spiral, fiber and framing modules, which may be useful in the present methods, are difficult to manufacture with conventional methods. It is possible to prepare for example spacer structures which comprise several layers. The spacers may be woven, or formed as woven-like structures, for example including a plurality of interconnected fibers. Such spacers enable good flow of solution and consume less energy.

The scavenger material may be provided in a form of a porous body obtained by additive manufacturing comprising a plurality of interconnected polymeric particles having an average particle diameter in the range of 10-200 µm, such as 1-100 µm. The porous body may have a porosity in the range of 10-70%, such as 20-70%, defined as volume of voids over total volume of the body. The scavenger material may have functionalities obtained by surface-treatment and/or doping or other treatment disclosed herein, so that the scavenger material may comprise one or more active component. The polymer may be the active component. The active component may be an ion exchanger, a member of a group of phosphoric and phosphonic acids, a member of a group of transition metals.

Scavenger material may be functionalized by using suitable treatment technology, such as plasma or laser treatment, for example low pressure air plasma treatment, which may take up to three hours, such as 0.5-3 h. The surface of the material is turned into porous and the material may obtain functional properties, such as ion exchange properties, absorption properties or the like properties, which can bind metal complexes from a solution. The material which may be functionalized in such way may include polymeric materials such as discussed herein, for example polyamides or polypropylenes, for example in a form of a sheet, a film, a bar, powder, granules, beads and the like objects and structures. The functionalized objects may be used for preparing devices such as filters or filter structures. For example two or more sheets may be combined as a stacked structure having a gap between each sheet, a film may be rolled into a roll having a gap between each layer, layered structures may be prepared from perforated porous surface-treated sheets, films, fibers, membranes or the like. Filter structures with high throughput flow properties can be obtained. This enables mass production of scavenger materials or devices. Alternatively the material may be treated on a moving belt in the form of power, granules, chips, or other suitable ices or forms, and packed into a suitable filter cartridge or casing. Also the stacked, rolled and/or otherwise combined structures may be packed in filter cartridges or casings, or supported with other a suitable support structures, so that filters, even with standard dimensions, are obtained an can be easily inserted into device setups.

It is possible to remove the recovered metals, such as gold or other precious metals from said objects and structures by mechanically abrading, cutting, or blowing the materials, or by using plasma, ultrasound, laser or the like, or by eluting with a suitable solution which is able to release the metals from the material. It is also possible to burn the scavenger material containing the recovered metal so that only the metal, such as gold, and ashes remain, and the metal can be further recovered. This option can be used especially if the scavenger material is in a form of fibers or other thin structure or form, and/or if inexpensive materials are used, such as plastic polymers, for example polyamide or polypropylene. In such case there would not be need to use any chemicals for eluting the metal, the process would be simpler and less solid waste would remain.

EXAMPLES

Example 1

Needle-to-plate plasma injection method was used (FIG. 2) for potassium iodide leaching agent activation to achieve redox/ORP voltage, such as 570-630 mV, for enabling and activating gold leaching solution to extract gold from gold plated electronic waste connectors. High voltage DC/AC, such as 500 V-30 kV, was fed between electrodes (2', 3') to generate plasma injection from graphene electrode to leaching liquid surface.

20-40 g/l of KI and 2-5 g/l of citric acid for pH adjustment were mixed in ambient room temperature with tap water in test reactor container (5'). The obtained solution was well mixed before providing plasma and a transparent solution was formed. High voltage source was switched on and various electrode distances were tested to find optimal plasma (4') creation conditions. ORP meter probe was placed in leaching solution (7'). In short time after plasma started to interact with leaching agent (7') and it's colour started to change first to yellowish brown and gradually changed more darker brown in colour. During this activation process ORP voltage measurement started to increase from gradually towards 570 mV. ORP voltage increase and colour change clearly indicates the increased presence of $I_2^-/I_3^-$. Once ORP level of 570 mV was reached. The colour of the leaching agent changed from transparent to yellow and finally dark brown. Gold-plated connectors were immersed into solution and after 5-10 minutes the gold plating was leached into a solution. It was noticed that pH adjustment to lower value seemed to accelerate the activation process.

Figure 2:
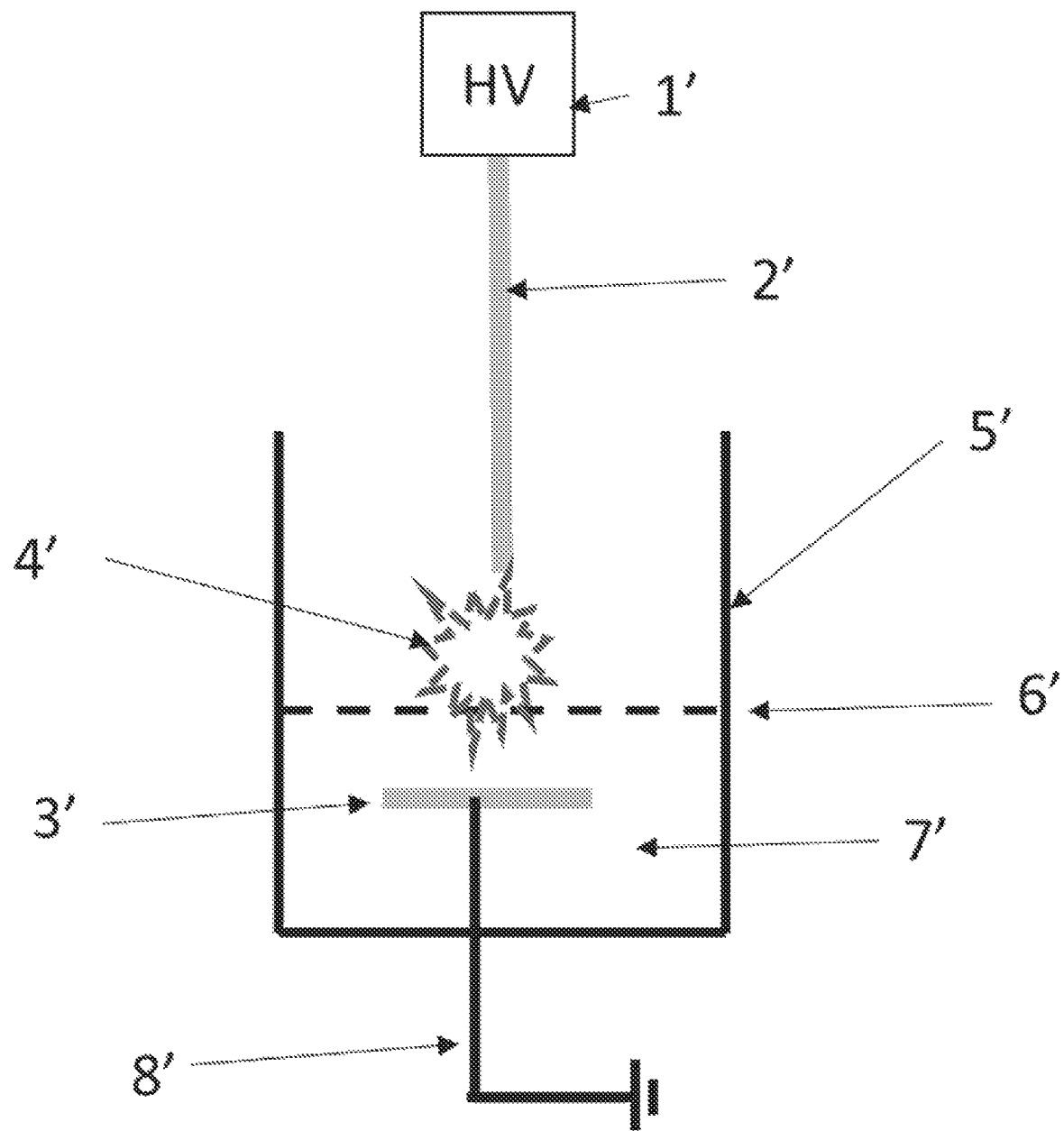
FIG. 2 shows an example of a needle-to-plasma injection setup

FIG. 2 shows the setup used in the tests. 1'=DC, AC or pulsed power source for high voltage (HV) to generate corona/plasma, 2'=graphene electrode, 3'=316 stainless steel cathode, 4'=plasma, 5'=reactor container, 6'=aqueous leaching agent liquid level, 7'=aqueous leaching agent solution, 8'=insulated cathode wire

Example 2

The same setup as in Example 1 was used except that both electrodes were placed in the aqueous solution. It was observed that higher voltage and current was required to initiate plasma generation.

Example 3

UV Light 20-40 g/l of KI and 2-5 g/l of citric acid for pH adjustment were mixed in ambient room temperature with tap water in test reactor container (5'). The obtained solution was well mixed before providing UV light from a UV light source and forming transparent or semi-transparent (slightly yellowish) solution. After 30 minutes of UV light exposure the measured ORP voltage level of 550 mV was reached. The colour of the leaching agent changed from transparent to yellow and finally dark brown "coffee color". Activation time of the leaching solution by UV light is depending on the light source power rating, distance from liquid and surface area of the leaching agent being exposed to UV radiation. It was noticed that pH adjustment to a lower value seemed to accelerate the activation process.

Example 4

Ultrasound

Stainless steel cylinder test reactor container (5') attached with ultrasound transducer was used with 1 liter of leaching agent. 20-40 g/l of KI and 2-5 g/l of citric acid for pH adjustment were mixed in ambient room temperature with tap water in test reactor container (5'). The obtained solution was well mixed before switching on the ultrasound generator and forming transparent or semi-transparent (slightly yellowish) solution. Ultrasound transducer frequency output was adjusted between 19-30 kHz range. Output power of the transducer was adjusted between 100-1000 W. Duty cycles between 20-75% were applied. Tests were conducted without pH adjustment and with weak acid (citric acid) pH adjustment and it was clearly shown that adjusting pH to lower levels had a great impact in acceleration of higher ORP measurement value in mV and colour change of the leaching agent from transparent to yellow and finally dark brown. When applying higher ultrasound radiation powers, the solution started to heat up to 80° C. Cooling of the solution might be required to maintain temperature levels where gaseous fumes of the leaching solution can be avoided or alternatively enclosed reactor may be used. Activation time of the leaching solution was between 5 to 20 minutes depending on output power and pH level adjustment. After sufficient time of ultrasound assisted leaching agent activation 607 mV ORP value was measured and leaching of gold-plated pins/connectors by activated leaching solution was conducted successfully.

Example 5

Ozone Generator 20-40 g/l of KI and 2-5 g/l of citric acid for pH adjustment were mixed in ambient room temperature with tap water in test reactor container (5'). The obtained solution was well mixed before switching on the ozone generator and forming transparent or semi-transparent (slightly yellowish) solution. After 10-20 minutes of O3 injection by ozone generator's output tube into a leaching solution the required ORP voltage level capable of leaching gold was reached. pH adjustment to lower value seems to accelerate activation process.

Example 6

Thermal Heating Solution by Using Hot Plate.

20-40 g/l of KI and 2-5 g/l of citric acid for pH adjustment were mixed in ambient room temperature with tap water in test reactor container (5'). The obtained solution was well mixed before switching on hot plate and forming transparent or semi-transparent (slightly yellowish) solution. The obtained leaching solution was heated until boiling and let boil 20 minutes and it was noticed that no impact on colour change. This test was conducted to confirm that applying only thermal heating of solution did not provide high enough energy to assist the activation of leaching solution in comparison to cavitation, UV, plasma and ozone generator principles.

Example 7

An Example of a Device Setup

Figure 3:
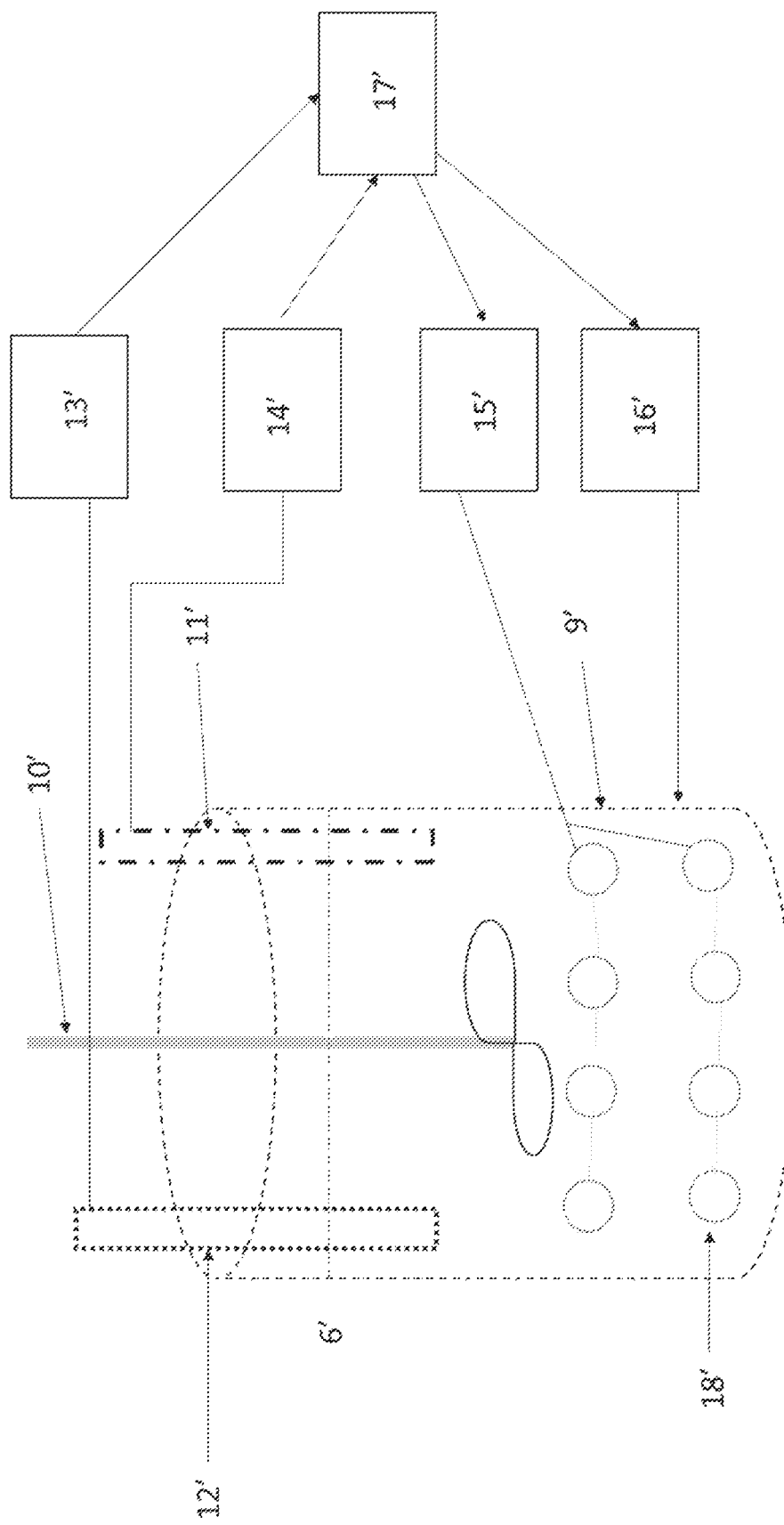
FIG. 3 shows an example of a reactor setup
Figure 4:
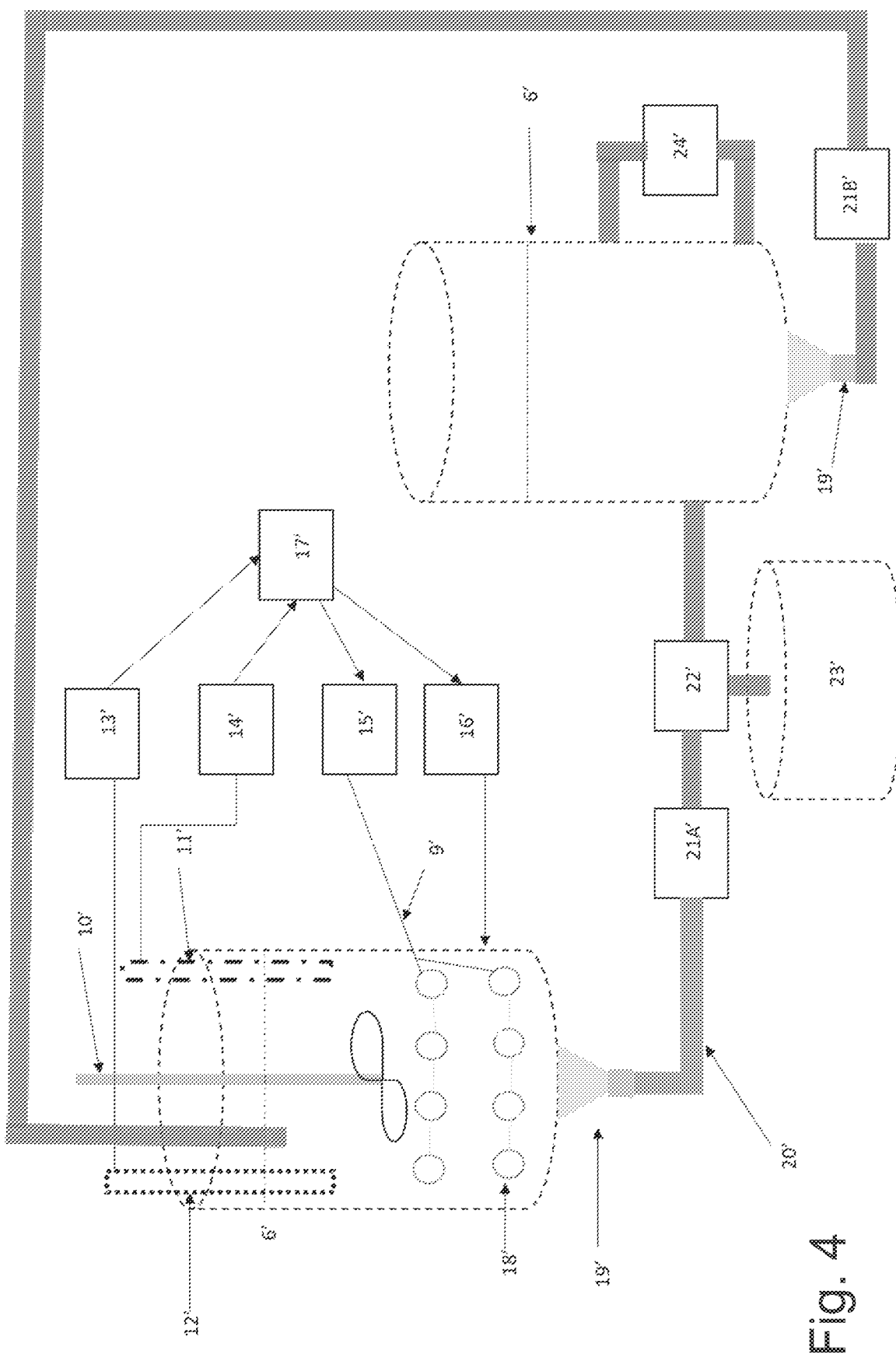
FIG. 4 shows an example of a processing system

FIG. 3 shows an example of the reactor setup equipped with a plurality of sources of ultrasound. FIG. 4 shows an example of a processing system comprising the reactor setup of FIG. 3 and means for recovering the metals. The device setup includes transducer wiring (9'), stirrer (10'), ORP measurement sensor (11'), pH sensor (12'), pH measurement device (13'), ORP measurement device (14'), ultrasound generator (15'), process control (16'), programmable logic controller for feedback controlled loops e.g. PID controller (17'), ultrasound transducers (18'), controllable valve for removing pregnant solution (19'), pump for transferring pregnant solution (21A'), Solid liquid separation & filtering unit (22'), storage for processed E-waste powder (23'), electrowinning unit for gold recovery from filtered pregnant solution (24'), pump (21B) for transferring used chemical back to leaching reactor for reactivating leaching solution by using ultrasound radiation, pH control and adding more reactant chemicals if necessary.

The invention claimed is:

1. A method for recovering metal from a metal-containing material by leaching, the method comprising
    a) providing an aqueous solution comprising a leaching agent precursor;
    b) treating the aqeuous solution with energy supplied from an external energy source to generate a reactive species comprising hydrogen peroxide;
    c) reacting the leaching agent precursor with the reactive species to form a leaching agent;
    d) providing a metal-containing material;
    d) reacting the metal-containing material with the leaching agent to obtain a soluble metal complex; and
    e) recovering the soluble metal complex;
        wherein the external energy source comprises a source of ultrasound, a source of plasma, a source of corona, a source of glow-discharge electrolysis, a source of contact glow discharge electrolysis, a Tesla coil or a source of UV light;
        wherein the external energy source is configured to controllably obtain the reactive species and to adjust the concentration of the reactive species in the solution by controlling the function of the source of external energy; and
        wherein the reactive species is not generated with electrolytic energy that does not involve a plasma source.

2. The method of claim 1, comprising controlling the source of energy automatically as feedback to one or more redox potential, pH, conductivity and temperature measured directly from the solution.

3. The method of claim 1, comprising
    providing one or more pH and/or redox meter(s) and/or measuring device(s) based on UV spectroscopy in the solution to obtain measurement data,
    arranging a feedback control circuit to control the function of the source of external energy by using the measurement data, and
    carrying out one or more of controlling actions to control the function of the external energy source adjust reaction rate and/or to obtain an optimal concentration of the leaching agent in the solution for releasing metals from the metal-containing material.

4. The method of claim 1, wherein the source of external energy is a source of ultrasound having a frequency in the range of 18 KHz-300 MHz.

5. The method of claim 1, wherein the leaching agent precursor comprises halogens, pseudo-halogens, metal complexes, organic metal-free redox pairs, interhalogen molecules, transition metal redox pairs, and combination thereof.

6. The method of claim 1, wherein the leaching agent precursor comprises an iodine material comprising iodide or iodate, or chlorine material, bromine material, or boric acid.

7. The method of claim 1, comprising adjusting the pH of the aqueous solution to below 6 by adding weak acid.

8. The method of claim 1, comprising providing a chemical oxidant selected from hypochlorite, hydrogen peroxide, persulfate, and ozone to the aqueous solution.

9. The method of claim 1, wherein the recovering the metal complexes comprise electrowinning, precipitation, cementation or loading onto activated carbon, and/or ion exchange resins, or a combination thereof, or precipitating the metal with L-ascorbic acid, D-(−)-isoascorbic acid, isoascorbic acid, oxalate, glucose, sodium borohydride or hydrazine.

10. The method of claim 1, comprising adding mixture of oxygen and argon to the aqueous solution.

11. The method of claim 1, comprising recycling the leaching solution back to the leaching after recovering the metal.

12. The method of claim 1, wherein the metal-containing material comprises ore, jewellery, or electronic waste.

13. A device for recovering metal from metal-containing material by leaching, the setup comprising
    a reactor arranged to receive metal-containing material and aqueous solution,
    one or more source(s) of external energy, which is not electrolytic energy which does not involve plasma formation, as only sources of external energy arranged to provide external energy to the aqueous solution in the reactor to form reactive species comprising hydrogen peroxide,
    a redox meter arranged to monitor the redox potential of the aqueous solution and optionally one or more mixer(s) and/or pump(s) arranged to convey the aqueous solution into and/or from the reactor, and/or to mix the solution,
    the device being, as a feedback to the redox potential measurement, arranged to adjust the one or more source(s) of external energy to maintain desired level of the reactions in the aqueous solution, wherein the one or more source(s) of external energy is/are selected from a source of ultrasound, a source of plasma, a source of corona, a source of glow-discharge electrolysis, a source of contact glow discharge electrolysis, a Tesla coil or a source of UV light.

14. The device of claim 13, comprising one or more ozone generator(s) arranged to provide ozone to the aqueous solution in the reactor.

15. The device of claim 13, comprising one or more mean(s) for recovering metal complexes.

16. The device of claim 15, wherein the metal complex is in one or more container(s) connected to the reactor.

17. The device of claim 15, wherein the means for recovering the metal complexes comprise electrowinning means, means for providing one or more precipitation chemical(s), means for providing one or more cementation chemical(s), activated carbon, scavenger material, and/or ion exchange resin, or a combination thereof.

* * * * *